United States Patent Office 2,979,254
Patented Apr. 11, 1961

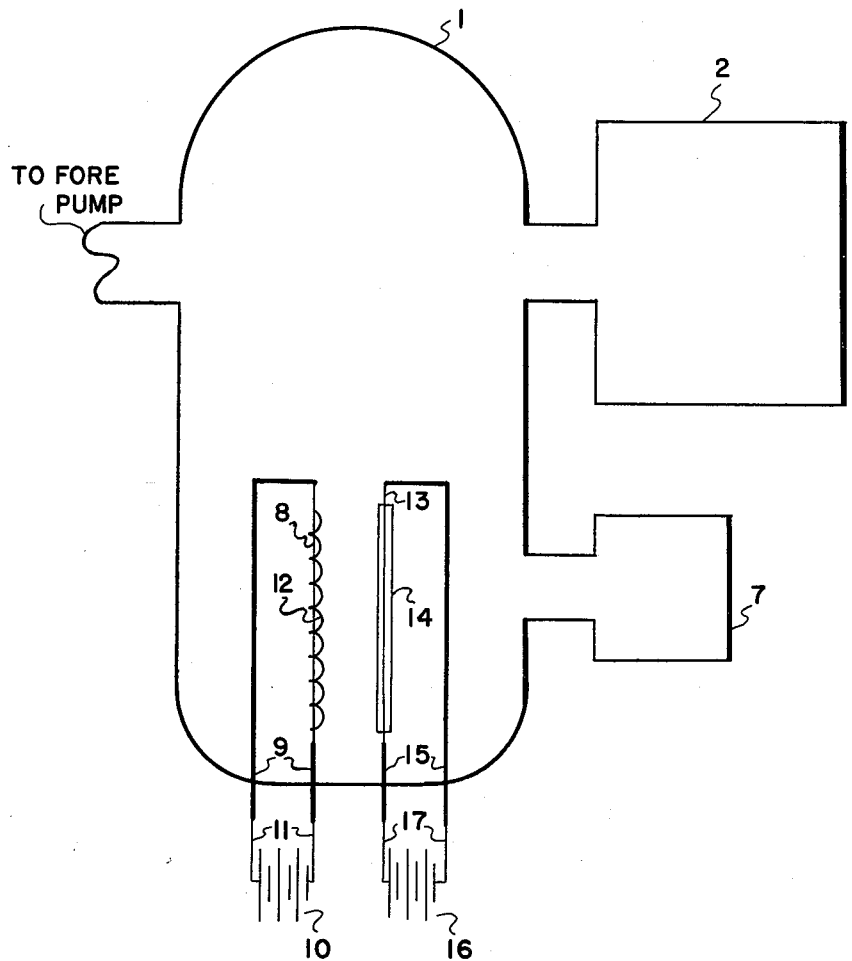

2,979,254

VACUUM DEVICE

Gunter Reich, Koln-Zollstock, Germany, assignor to National Research Corporation, Cambridge, Mass., a corporation of Massachusetts Filed Mar. 21, 1958, Ser. No. 722,867

4 Claims. (Cl. 230—69)

It is known that gases are absorbed at very low pressures while at the same time with an electric discharge or in combination with an ion source metals or nonmetals are vaporized or absorptive clean metallic surfaces are produced (gettering effect). Present investigations have shown that at pressures below $10^{-5}$ mm. Hg the absorbing gases can react with each other or with the substances dissolved or bound in the getter metal. There then exists gaseous compounds which were not present originally in the receptacle and which are bound only very slowly or not at all during further gettering. Thus $CH_4$ and $C_2H_6$ exist in the surprising manner as reaction products, in absorption of $H_2O$ and CO on titanium. The final pressure attainable with the ion getter pump is limited. Further, the reaction of $H_2O$ and $N_2$ to form $NH_3$ has been observed. By these reactions which can be followed so that, for example, only towards the end is $CH_4$ observed with the mass spectrometer.

Thus there is presented the problem of inhibiting, poisoning, the catalytic effect of the getter material so that the undesired reaction products do not occur. This, for example, can occur so that phosphorus is vaporized with the getter material as the catalytic poisoner. Other poisoners known from the technology of catalysis have similar effects to that of phosphorus.

It is possible in this fashion to prevent the formation of the undesired reaction products completely.

Phosphorus or such other poisoners may be vaporized at the same time as the gettering material is being vaporized, after the gettering material has been vaporized, or intermittently, i.e. from time to time, while the gettering material is being vaporized.

For a fuller understanding of the nature and objects of the invention reference should be had to the drawing which is a schematic illustration of an ionization getter pump wherein the process of the present invention can be carried out.

Referring to the drawing there are shown the essential components of the ionization getter pump as illustrated in Fig. 1 of the Connor patent U.S. 2,796,555. A chamber 1 is connected to a system 2 to be evacuated. Suitable means for ionizing gases is diagrammatically indicated at 7. Within chamber 1 there is a filament 8 overwound with a suitable getter material 12. The filament 8 is supported by conductive members 9 which are connected to a suitable voltage source 10 by leads 11. In addition there is illustrated a filament 13 having a coating of phosphorus 14 thereon. The filament 13 is supported by conductive members 15 which are connected to a suitable voltage source 16 by leads 17.

Since certain changes may be made in the above process without departing from the scope of the invention herein involved, it is intended that all matter contained in the above description or shown in the accompanying drawing shall be interpreted as illustrative and not in a limiting sense.

What is claimed is:

1. In the process of producing a high vacuum by means of an ion getter pump wherein a getter material is vaporized and condensed in position to sorb gases in the pump, said getter having a catalytic effect on sorbed gases with attendant gaseous reaction products, the improvement which comprises vaporizing phosphorus in a location which permits the phosphorus vapors to condense on the condensed getter material, said phosphorus inhibiting said catalytic effect, whereby the formation of said gaseous reaction products is prevented.

2. The process according to claim 1 wherein the phosphorus is vaporized at the same time as the gettering material.

3. The process according to claim 1 wherein the phosphorus is vaporized immediately after the vaporization of the gettering material.

4. The process according to claim 1 wherein the phosphorus is vaporized from time to time.

References Cited in the file of this patent

UNITED STATES PATENTS 1,237,210      Langmuir               Aug. 14, 1917